United States Patent
Meyer

(10) Patent No.: US 9,404,769 B2
(45) Date of Patent: Aug. 2, 2016

(54) ANGULAR-POSITION MEASURING DEVICE

(71) Applicant: DR. JOHANNES HEIDENHAIN GMBH, Traunreut (DE)

(72) Inventor: Hermann Meyer, Schneizlreuth (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 81 days.

(21) Appl. No.: 14/278,748

(22) Filed: May 15, 2014

(65) Prior Publication Data

US 2014/0338204 A1  Nov. 20, 2014

(30) Foreign Application Priority Data

May 16, 2013  (DE) .......................... 10 2013 209 106

(51) Int. Cl.
| | | |
|---|---|---|
| *G01B 7/30* | (2006.01) | |
| *G01D 5/08* | (2006.01) | |
| *G01D 3/028* | (2006.01) | |
| *G01D 5/347* | (2006.01) | |
| *F16C 33/74* | (2006.01) | |
| *F16C 33/76* | (2006.01) | |
| *F16C 19/00* | (2006.01) | |

(52) U.S. Cl.
CPC ................ *G01D 5/08* (2013.01); *F16C 33/745* (2013.01); *F16C 33/761* (2013.01); *G01B 7/30* (2013.01); *G01D 3/028* (2013.01); *G01D 5/34738* (2013.01); *F16C 19/00* (2013.01); *F16C 2361/65* (2013.01)

(58) Field of Classification Search
CPC .............. G01D 5/08; G01B 3/56; G01B 5/24; G01B 7/30; G01B 11/26; G01B 21/22
USPC .......... 33/1 PT, 534; 277/306, 358, 361–363, 277/366–369
See application file for complete search history.

(56) References Cited

U.S. PATENT DOCUMENTS

| | | | | |
|---|---|---|---|---|
| 4,216,973 A * | 8/1980 | Kessinger, Jr. | ......... | B62D 55/15 277/349 |
| 4,369,578 A * | 1/1983 | Ernst | .................... | G01D 5/3473 250/231.13 |
| 4,373,147 A * | 2/1983 | Carlson, Jr. | .......... | H02K 16/025 310/112 |
| 4,731,930 A * | 3/1988 | Miller | ................ | G01D 5/34769 277/345 |
| 5,657,544 A * | 8/1997 | Ota | ...................... | G01D 11/245 33/1 N |
| 6,507,292 B1 * | 1/2003 | Feichtinger | ............ | G01D 11/24 341/16 |
| 6,617,571 B2 * | 9/2003 | Thaler | .................. | G01D 5/3473 250/231.13 |
| 6,671,972 B2 * | 1/2004 | Mitterreiter | .......... | G01D 5/3473 33/1 PT |
| 6,688,006 B2 * | 2/2004 | Itomi | .................... | G01D 5/165 33/1 N |
| 7,308,765 B2 * | 12/2007 | Riepertinger | .......... | G01D 11/30 33/1 N |

(Continued)

FOREIGN PATENT DOCUMENTS

EP  2 378 251  10/2011

*Primary Examiner* — Christopher Fulton
(74) *Attorney, Agent, or Firm* — Kenyon & Kenyon LLP

(57) ABSTRACT

An angular-position measuring device includes a shaft rotatable relative to a body about an axis extending in a z-direction. A measuring standard having an end face is fastened on the shaft in rotatably fixed manner. The body includes a scanning device for scanning the measuring standard. Both the roller bearing and a sealing unit are provided on the side of the measuring standard facing the end face relative to the z-direction, The sealing unit includes rings that are rotatable relative to each other and are separated from each other by a gap, the gap being filled at least partially with a fluid.

15 Claims, 2 Drawing Sheets

(56) References Cited

U.S. PATENT DOCUMENTS

| | | | |
|---|---|---|---|
| 7,507,949 B2 * | 3/2009 | Scheglmann | G11B 5/4813 250/231.13 |
| 8,584,369 B2 | 11/2013 | Meyer | |
| 2008/0029967 A1 * | 2/2008 | Nakagawa | F16J 15/3256 277/349 |

* cited by examiner

ANGULAR-POSITION MEASURING DEVICE

CROSS-REFERENCE TO RELATED APPLICATIONS

The present application claims priority to Application No. 10 2013 209 106.0, filed in the Federal Republic of Germany on May 16, 2013, which is expressly incorporated herein in its entirety by reference thereto.

FIELD OF THE INVENTION

The present invention relates to an angular-position measuring device.

BACKGROUND INFORMATION

Angular-position measuring devices, also referred to frequently as rotary encoders, are used to measure rotational movements of a rotationally mounted machine part, particularly a shaft, over one or more revolutions. In so doing, the rotational movement is recorded incrementally or absolutely. In connection with gear racks and gear wheels or with threaded spindles, linear motions can also be measured by an angular-position measuring device. Such angular-position measuring devices are often used in conjunction with electric motors to generate a commutation signal.

Angular-position measuring devices which must satisfy comparatively high demands with regard to measuring accuracy frequently operate according to an optical measuring principle, the measuring standard often being implemented as a glass ring, for example, having an angle scaling applied on it. In this case, the angle scaling is scanned by an incident light technique or a transmitted light technique. In order to ensure high measuring accuracy, it is important for the measuring standard to be protected from contaminants. It may be particularly disadvantageous if lubricant or components thereof escape from the roller bearing and deposit on the measuring standard, especially in the area of the angle scaling. Such contaminants are often in the form of droplets, and exhibit an optical effect, similar to that of a lens. Under such circumstances, the light beams are deflected accordingly, which can lead to a faulty measurement.

European Published Patent Application No. 2 378 251 describes an angular-position measuring device which has a shaft having a groove that is connected to a hollow space for receiving lubricant.

SUMMARY

Example embodiments of the present invention provide an angular-position measuring device, by which high measuring accuracy is attainable reliably and permanently.

According to example embodiments of the present invention, an angular-position measuring device includes a shaft which, with the aid of at least one roller bearing, is disposed in a manner allowing rotation relative to a body about an axis that extends in a z-direction. A measuring standard is fastened in rotatably fixed manner on the shaft, the measuring standard having at least one end face. The body has a scanning device for scanning the measuring standard. Both the roller bearing and a sealing unit are disposed on one side of the measuring standard, e.g., the side in question facing the end face relative to the z-direction. The sealing unit includes rings rotatable relative to each other, which are separated from each other by a gap, especially in the radial direction, the gap being filled at least partially with a fluid. In particular, the sealing unit is designed to be a non-contact sealing unit.

The angular-position measuring device may be used to measure a rotational movement, e.g., to determine an existing rotational position or rotational speed.

The measuring standard may be ring-shaped and, viewed geometrically, may be arranged as a hollow cylinder having circumferential lateral sides which have an extremely small height, and ring-shaped end faces, aligned parallel to each other, which may also be referred to as bottom or top surfaces. The angle scaling or angle coding may be applied on one of the end faces or one of the lateral sides, e.g., on the external lateral side.

The measuring standard may be fixed in position on the shaft such that the aforementioned end face is cut at a point of intersection by a straight line which has a directional component in the z-direction. In particular, the end face may be located in a plane that is oriented with an orthogonal directional component in relation to the z-direction. Accordingly, a normal vector which has a directional component parallel to the z-direction is assignable to the plane in which the end face lies. For example, the end face is oriented orthogonally to the z-direction, e.g., the normal vector of the end face in question is aligned parallel to the axis, and therefore is oriented in the z-direction.

The fact that both the roller bearing and the sealing unit are disposed on the side of the measuring standard which is facing the end face in relation to the z-direction means that, starting from the measuring standard, first the roller bearing and then the sealing unit are disposed in the axial direction (z-direction) along the shaft. Alternatively, starting from the measuring standard, first the sealing unit and then the roller bearing may also be disposed in the axial direction. Consequently, the measuring standard is not located between the roller bearing and the sealing unit.

The angular-position measuring device may be configured such that the sealing unit has an inner ring mounted on the shaft and an outer ring mounted on the body. The rings are arranged such that the maximum diameter of the ring mounted on the shaft is greater than the minimum diameter of the ring mounted on the body.

The inner ring of the sealing unit mounted on the shaft may have an extension projecting in the radial direction, the extension being in contact with the fluid during operation of the angular-position measuring device. Moreover, the angular-position measuring device may be arranged such that the extension dips into a circumferential groove of the other sealing-unit ring mounted on the body.

At least one of the rings of the sealing unit may be made of multiple parts, e.g., two parts. For example, the ring mounted on the body may be multi-part.

The angular-position measuring device may have two roller bearings which, for example, may be disposed with axial offset, e.g., with an offset in the z-direction, on the shaft. In this construction, the sealing unit may have one ring mounted on the shaft and one ring mounted on the body, in which case, the rings may be located between the roller bearings.

In the final-assembled state of the angular-position measuring device, at least one of the rings of the sealing unit may be preloaded in the z-direction. For example, the ring mounted on the body is preloaded.

Each of the roller bearings may have an inner race, an outer race, and rolling elements that are arranged radially between the inner race and the outer race, lubricant being located in the area of the rolling elements. The sealing-unit ring mounted on the body may be preloaded such that a force oriented in the z-direction is able to be generated, by which the outer races of the roller bearings are preloaded axially with respect to each other. Alternatively or additionally, the sealing-unit ring mounted on the shaft may also be preloaded such that a force oriented in the z-direction is able to be generated, by which the inner races of the roller bearings are preloaded axially with respect to each other.

The ring mounted on the shaft may have a reservoir for the fluid, e.g., oil. The sealing unit includes rings, rotatable relative to each other, which may be separated from each other by a gap in the radial direction, the gap being filled at least partially with a fluid. In this context, the reservoir may be disposed radially inside, so that when the ring is rotating, the fluid located in the reservoir is pushed into the gap.

Additional features and aspects of example embodiments of the present invention are described in more detail below with reference to the appended Figures.

DETAILED DESCRIPTION

Figure 1:
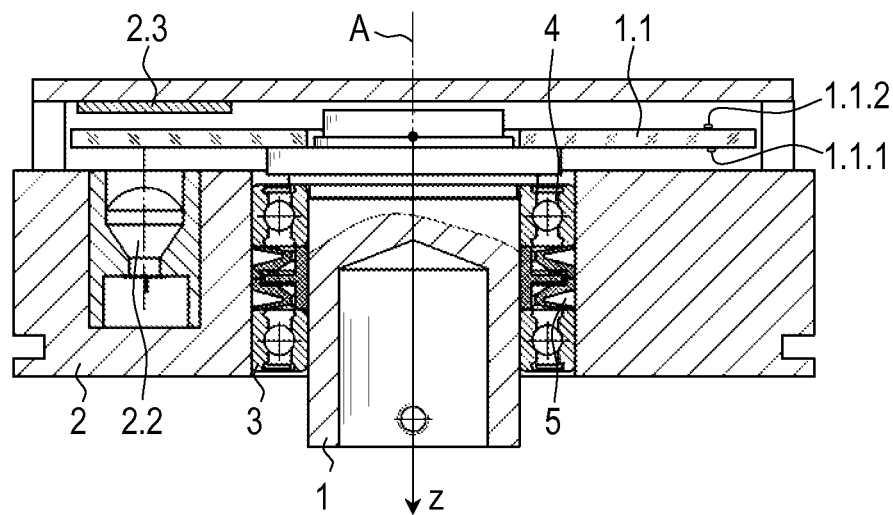
FIG. 1 is a longitudinal cross-sectional view of an angular-position measuring device.

An angular-position measuring device, illustrated in a longitudinal cross-sectional view in FIG. 1, includes a stator and a rotor. The rotor has a shaft 1 having a shoulder to which a measuring standard 1.1 is joined firmly, e.g., by an adhesive, centrally relative to axis A and with only slight tolerance deviations. Axis A extends in the z-direction. Measuring standard 1.1 is produced with high precision in terms of its dimensional accuracy and planarity. Measuring standard 1.1 is made of glass and is ring-shaped. The measuring standard 1.1 has two end faces 1.1.1, 1.1.2, and an angle scaling applied on one of end faces 1.1.1, 1.1.2. For example, the angle scaling may be arranged as an incremental graduation having radially oriented scale lines. However, additionally or alternatively, an absolute code may also be provided.

End faces 1.1.1, 1.1.2 are arranged in a plane which is oriented with an orthogonal directional component in relation to the z-direction. In other words, a normal vector to one of end faces 1.1.1, 1.1.2 has a directional component parallel to the z-direction. In the exemplary embodiments illustrated, end faces 1.1.1, 1.1.2 are oriented orthogonally to the z-direction, e.g., the normal vectors of end faces 1.1.1, 1.1.2 are aligned parallel to axis A, and therefore are oriented in the z-direction.

Shaft 1 is rotationally mounted by two roller bearings 3, 4 within a body 2 which is to be assigned to the stator.

Body 2 has a light source 2.2 which, for example, includes an LED and a collimator lens, so that collimated light is emitted by light source 2.2. This light passes through measuring standard 1.1, e.g., its angle scaling, and is modulated according to the angular position between rotor and stator, i.e., shaft 1 and body 2. The modulated light is scanned by a scanning device 2.3 which is secured on body 2. Suitable photosensitive detectors are provided on scanning device 2.3 implemented as a printed circuit board fitted with components. Scanning device 2.3 also includes electronic components for signal forming—for example, for amplification and digitizing—of the scanning signals supplied by the detectors. An electrical connection is produced between the angular-position measuring device and sequential electronics via a connecting cable, so that electric signals and electrical energy may be transmitted between the sequential electronics and the angular-position measuring device.

A housing may be mounted around body 2 and around the remaining components on the stator side, so that, for example, light source 2.2, measuring standard 1.1, and scanning device 2.3 are protected from environmental influences. Frequently, such housings are not air-tight, for example, for practical applications in connection with electrical drives. If desired, a housing may also be omitted completely.

The angular-position measuring device is intended for attachment to a machine, shaft 1 being formed for the rotatably-fixed connection to a component part, for example, a motor shaft to be measured. Thus, the angular-position measuring device is able to determine the relative angular position between the stator and the rotor, e.g., between shaft 1 and body 2. Such angular-position measuring devices are often referred to as rotary encoders, as well.

Figure 2:
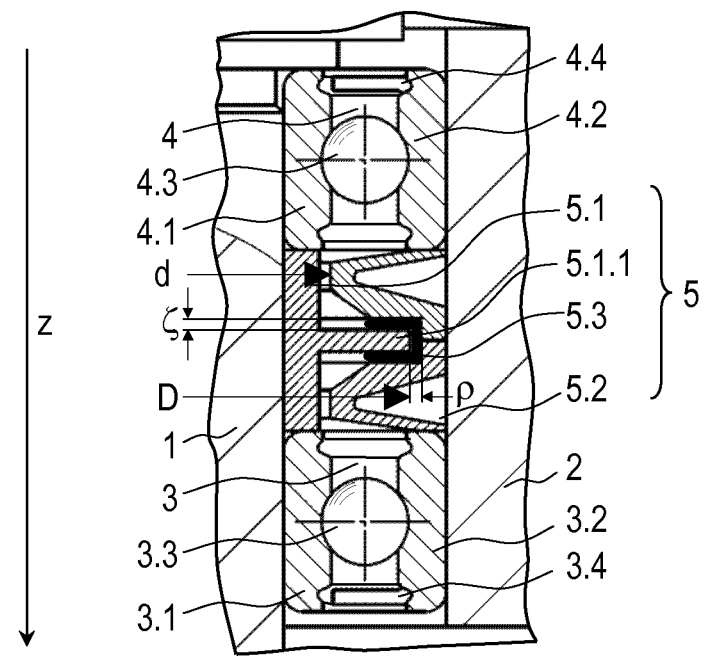
FIG. 2 is an enlarged view of the angular-position measuring device.

FIG. 2 is an enlarged view of the angular-position measuring device. Roller bearings 3, 4, respectively, include an inner race 3.1, 4.1, an outer race 3.2, 4.2 as well as ball bearings 3.3, 4.3 situated radially between inner races 3.1, 4.1 and outer races 3.2, 4.2, and, in each case, a cover washer 3.4, 4.4.

Arranged axially between the two roller bearings 3, 4 is a sealing unit 5 which includes an inner ring 5.1 and an outer ring 5.2. On the rotor side, inner ring 5.1 is mounted on shaft 1. This ring 5.1 includes a circumferential extension 5.1.1 projecting radially to the outside. On the stator side, a two-piece ring 5.2 is mounted axially between outer races 3.2, 4.2 on body 2. Ring 5.2 and extension 5.1.1 overlap radially, so that a maximum diameter D of inner ring 5.1 mounted on shaft 1 is greater than minimum diameter d of outer ring 5.2 mounted on body 2. As illustrated in FIG. 2, in each case, a gap having width $\zeta$ exists in the axial direction at both sides of extension 5.1.1. In addition, extension 5.1.1 and outer ring 5.2 mounted on body 2 are disposed opposite one another and are separated by a circumferential gap having width $\rho$ in the radial direction.

In the course of assembling the angular-position measuring device, oil is provided in the gap between ring 5.2 mounted on body 2 and extension 5.1.1. The gap is comparatively small, so that an oil film 5.3 is able to be retained in this gap by capillary forces.

Two-piece outer ring 5.2 mounted on body 2 on the stator side has a greater axial height in the relaxed state than the provided spacing of roller bearings 3, 4, especially of outer races 3.2, 4.2 in the angular-position measuring device. For this reason, after being mounted in the angular-position measuring device, outer ring 5.2 is preloaded in the z-direction, e.g., is compressed elastically in the axial direction. Accordingly, an axial preload force is introduced on outer races 3.2, 4.2. The preload force is also transferred to inner races 3.1, 4.1 via ball bearings 3.3, 4.3 and the bearing grooves. Inner races 3.1, 4.1 are joined immovably to shaft 1 by an adhesive or a press fit, for example. Thus, sealing unit 5 fulfills not only a sealing function, but is also used to achieve a mechanical preloading between roller bearings 3, 4.

For perfect operation of the angular-position measuring device, it is necessary for the roller bearings 3, 4 to be lubricated, which is why in each case lubricant or lubricating grease is provided between inner race 3.1, 4.1 and outer race 3.2, 4.2. Ring-shaped cover washers 3.4, 4.4 are to be used basically to keep the lubricant or lubricating grease in roller bearings 3, 4 and prevent it from migrating in the direction of optically scannable measuring standard 1.1. Cover washers 3.4, 4.4 are joined firmly to respective outer races 3.2, 4.2, so that no relative movement takes place between cover washers 3.4, 4.4 and respective outer race 3.2, 4.2 during operation of the angular-position measuring device. In order to generate as little frictional heat as possible in the angular-position measuring device, cover washers 3.4, 4.4 do not touch any rotating parts, especially not inner races 3.1, 4.1.

During operation of the angular-position measuring device, ring-shaped measuring standard 1.1 may rotate with considerable speed. Similar to a radial-flow fan, a radial pressure gradient is thereby generated, so that a lower air pressure prevails radially inside at measuring standard 1.1, especially radially inside at end faces 1.1.1, 1.1.2, than in the radially outer area. Consequently, a suction effect is developed due to rotating measuring standard 1.1. In order to ensure that in the case of such pressure conditions, measuring standard 1.1 is not contaminated by lubricant components of roller bearings 3, 4, sealing unit 5 having oil film 5.3 is provided axially between roller bearings 3, 4. Because of this sealing unit 5, no air flows through roller bearings 3, 4, even in the event of an underpressure in the radially inner area of measuring standard 1.1. Particularly if the angular-position measuring device has no housing or has a housing which is not air-tight, it is important that air is prevented from flowing through roller bearings 3, 4. The rotation of shaft 1 also causes a rotation of inner ring 5.1 of sealing unit 5 with its extension 5.1.1. Extension 5.1.1 is moistened with oil, caused by capillary forces or the effects of interfacial surface tensions. Therefore, as speed rises, oil film 5.3 is pushed more and more into the radially outer area, so that optimal sealing is ensured at high speeds. On the other hand, however, the suction effect due to rotating measuring standard 1.1 described above is the greatest at high speeds. Thus, inner and outer ring 5.1, 5.2 of sealing unit 5 do not touch each other. The result, for example, is that sealing unit 5 works with extremely low friction, and therefore virtually no waste heat is generated in the angular-position measuring device.

Figure 3:
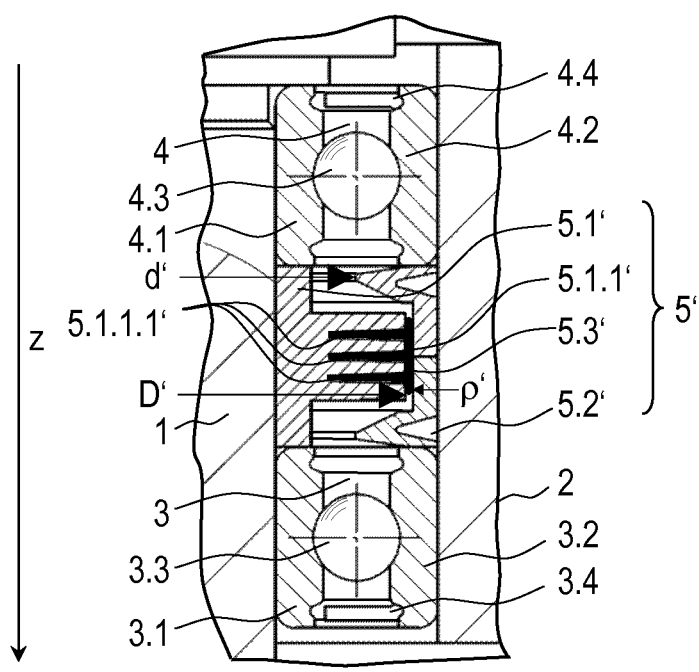
FIG. 3 is an enlarged view of an angular-position measuring device.

FIG. 3 is an enlarged view of another exemplary embodiment. It differs from the above-described exemplary embodiment with regard to a modified sealing unit 5'. This sealing unit 5' includes an inner ring 5.1', which is mounted on shaft 1 and has a circumferential extension 5.1.1' projecting radially to the outside. This extension 5.1.1' includes three circumferential recesses which are used as reservoirs 5.1.1.1' for the oil. In addition, sealing unit 5' includes an outer ring 5.2' which is two-part and is mounted on the stator side axially between outer races 3.2, 4.2 on body 2.

Ring 5.2' and extension 5.1.1' overlap radially in the second exemplary embodiment as well, so that maximum diameter D' of inner ring 5.1' mounted on shaft 1 is greater than minimum diameter d' of outer ring 5.2' mounted on body 2. Extension 5.1.1' and outer ring 5.2' mounted on body 2 are arranged opposite one another, separated by a circumferential gap having width ρ' in the radial direction.

Reservoirs 5.1.1.1' are arranged radially inside in relation to the circumferential gap having width ρ', so that during operation of the angular-position measuring device, e.g., when ring 5.1' is rotating, the oil located in reservoirs 5.1.1.1' is pressed into the gap.

In the installed state, as illustrated in FIG. 3, ring 5.2' mounted on body 2 is preloaded in the z-direction, so that analogous to the first exemplary embodiment, an axial preloading of roller bearings 3, 4 by sealing unit 5' is achieved.

Due to the special form of the angular-position measuring device, it is possible to keep lubricant residues, e.g., oil droplets that escape from the lubricant, away from the measuring standard. Such lubricant residues often lead to faulty measurements, because the beam path of the light emitted by light source 2.2 may be influenced by them. It is also ensured that the lubricant residues are kept away during operation at high speeds. The reason is that the centrifugal forces caused at high speeds improve the sealing effect of the sealing unit. Even though high sealing effectiveness is attained by sealing unit 5, 5' during operation, virtually no heat is generated in the angular-position measuring device by sealing unit 5, 5', because it operates with extremely low friction. This aspect is also a contributing factor to the very precise and fault-free measuring results achievable by the angular-position measuring device.

What is claimed is:

1. An angular-position measuring device, comprising:
   a body;
   a roller bearing;
   a shaft rotatable relative to the body, via the roller bearing, about an axis extending in a z-direction; and
   a measuring standard, having an end face, fastened on the shaft in rotatably fixed manner;
   wherein the body includes a scanning device adapted to scan the measuring standard;
   wherein both the roller bearing and a sealing unit are arranged on a side of the measuring standard that faces the end face relative to the z-direction; and
   wherein the sealing unit includes rings rotatable relative to each other and separated from each other by a gap, the gap being at least partially filled with a fluid.

2. The angular-position measuring device according to claim 1, wherein the sealing unit includes a ring mounted on the shaft and a ring mounted on the body, a maximum diameter of the ring mounted on the shaft being greater than a minimum diameter of the ring mounted on the body.

3. The angular-position measuring device according to claim 2, wherein the ring mounted on the shaft includes a radially-projecting extension in contact with the fluid.

4. The angular-position measuring device according to claim 2, wherein the ring mounted on the shaft includes a radially-projecting extension that extends into a circumferential groove of the ring mounted on the body.

5. The angular-position measuring device according to claim 1, wherein at least one of the rings is arranged as a multi-part component.

6. The angular-position measuring device according to claim 1, wherein the angular-position measuring device includes two roller bearings.

7. The angular-position measuring device according to claim 6, wherein the sealing unit includes a ring mounted on the shaft and a ring mounted on the body, the rings being arranged between the roller bearings.

8. The angular-position measuring device according to claim 7, wherein at least one of the rings is preloaded in the z-direction.

9. The angular-position measuring device according to claim 7, wherein the ring mounted on the body is preloaded in the z-direction.

10. The angular-position measuring device according to claim 1, wherein the ring mounted on the shaft includes a reservoir for the fluid.

11. The angular-position measuring device according to claim 10, wherein the ring mounted on the shaft includes a radially-extending projection including at least one recess forming the reservoir.

12. The angular-position measuring device according to claim 10, wherein the ring mounted on the shaft includes a radially-extending projection including a plurality of recesses forming the reservoir.

13. The angular-position measuring device according to claim 1, wherein the fluid includes an oil.

14. The angular-position measuring device according to claim 1, wherein a radially-inner ring of the sealing unit and a radially-outer ring of the sealing unit do not contact each other.

15. The angular-position measuring device according to claim 1, wherein the fluid in the sealing unit is adapted to prevent air flow through the roller bearing.

* * * * *